(12) United States Patent
Noji et al.

(10) Patent No.: US 10,825,190 B2
(45) Date of Patent: Nov. 3, 2020

(54) DYNAMIC IMAGE PROCESSING APPARATUS FOR ALIGNING FRAME IMAGES OBTAINED BY PHOTOGRAPHING DYNAMIC STATE OF CHEST BASED ON MOVEMENT OF LUNG-FIELD REGION

(71) Applicant: KONICA MINOLTA, INC., Tokyo (JP)

(72) Inventors: Sho Noji, Kokubunji (JP); Kenta Shimamura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 121 days.

(21) Appl. No.: 16/137,486

(22) Filed: Sep. 20, 2018

(65) Prior Publication Data

US 2019/0102893 A1      Apr. 4, 2019

(30) Foreign Application Priority Data

Oct. 3, 2017   (JP) .................................. 2017-193141

(51) Int. Cl.
| | |
|---|---|
| *G06T 7/11* | (2017.01) |
| *G06T 7/12* | (2017.01) |
| *G06T 7/33* | (2017.01) |
| *G06T 7/246* | (2017.01) |
| *G06T 7/73* | (2017.01) |

(52) U.S. Cl.
CPC ................ *G06T 7/337* (2017.01); *G06T 7/11* (2017.01); *G06T 7/12* (2017.01); *G06T 7/248* (2017.01); *G06T 7/74* (2017.01); *G06T 2207/10116* (2013.01); *G06T 2207/30061* (2013.01); *G06T 2207/30101* (2013.01)

(58) Field of Classification Search
None
See application file for complete search history.

(56) References Cited

U.S. PATENT DOCUMENTS

| | | | |
|---|---|---|---|
| 7,286,694 B2 | 10/2007 | Oosawa | |
| 2002/0072665 A1* | 6/2002 | Ozaki | .................. A61B 6/5217 600/408 |
| 2011/0257919 A1* | 10/2011 | Reiner | .................. G06F 19/321 702/81 |

FOREIGN PATENT DOCUMENTS

JP          4493408 B2      6/2010

* cited by examiner

*Primary Examiner* — Idowu O Osifade
(74) *Attorney, Agent, or Firm* — Holtz, Holtz & Volek PC (57) ABSTRACT

A dynamic image processing apparatus includes: a hardware processor that: extracts a lung-field region from at least one of a plurality of frame images of a chest dynamic image obtained by radiographing a dynamic state of a chest of an examinee; sets a feature point in a position that moves according to a movement of a lung field due to respiration in the lung-field region extracted by the hardware processor; searches a frame image other than a frame image in which the feature point has been set for a corresponding point that corresponds to the feature point set by the hardware processor, and estimates a correspondence relationship of each pixel in the lung-field region among the plurality of frame images in accordance with a positional relationship between the feature point set by the hardware processor and the corresponding point searched for by the hardware processor.

16 Claims, 8 Drawing Sheets

● : FEATURE POINT

FIG. 4B

● : FEATURE POINT
(ON PULMONARY BLOOD VESSEL)

FIG. 4C

● : FEATURE POINT
(ON PULMONARY BLOOD VESSEL)
○ : FEATURE POINT
(ON LUNG-FIELD CONTOUR)

DYNAMIC IMAGE PROCESSING APPARATUS FOR ALIGNING FRAME IMAGES OBTAINED BY PHOTOGRAPHING DYNAMIC STATE OF CHEST BASED ON MOVEMENT OF LUNG-FIELD REGION

The entire disclosure of Japanese patent Application No. 2017-193141, filed on Oct. 3, 2017, is incorporated herein by reference in its entirety.

BACKGROUND

Technological Field

The present invention relates to a dynamic image processing apparatus.

Description of the Related Art

Conventionally, a technique is known for aligning a subject that is included in a plurality of images indicating a change in a state of the subject. In JP 4493408 B2, for example, a technique is described in which, in a chest dynamic image obtained by radiographing a dynamic state of the chest, a reference image is set between a maximum exhalation image and a maximum inhalation image, and alignment with an adjacent image is sequentially performed on intermediate images between the maximum exhalation image and the maximum inhalation image via the reference image. In JP 4493408 B2, global matching and local matching are used as processing for obtaining a corresponding position of two images in alignment. JP 4493408 B2 describes that, in local matching, an entirety of one image of the two images to be aligned is sectioned into a large number of template ROIs, a corresponding position in the other image of each center pixel of each of the template ROIs is obtained, and corresponding positions of the other pixels are obtained on the basis of the obtained corresponding position.

However, the chest dynamic image includes a structure (such as the ribs) that moves in a direction different from a direction of the movement of the lung field due to respiration. Therefore, as an example, when a feature point (a center pixel of a template ROI) for alignment is set in both the lung field and the ribs, a contradiction is caused in the direction of movement, and alignment fails to be performed in such a way that pixels indicating biologically the same position in the lung field accurately correspond to each other. As a result, information relating to a change in density due to respiration in biologically the same position in the lung field fails to be accurately extracted from the chest dynamic image.

SUMMARY

An object of the present invention is to improve the accuracy of the extraction of information relating to a change in density in the lung field due to respiration in a chest dynamic image.

To achieve the abovementioned object, according to an aspect of the present invention, a dynamic image processing apparatus reflecting one aspect of the present invention comprises a hardware processor that: extracts a lung-field region from at least one of a plurality of frame images of a chest dynamic image obtained by radiographing a dynamic state of a chest of an examinee; sets a feature point in a position that moves according to a movement of a lung field due to respiration in the lung-field region extracted by the hardware processor; searches a frame image other than a frame image in which the feature point has been set for a corresponding point that corresponds to the feature point set by the hardware processor, and estimates a correspondence relationship of each pixel in the lung-field region among the plurality of frame images in accordance with a positional relationship between the feature point set by the hardware processor and the corresponding point searched for by the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

[Configuration of Dynamic Image Processing System 100]

First, a configuration according to an embodiment of the present invention is described.

Figure 1:
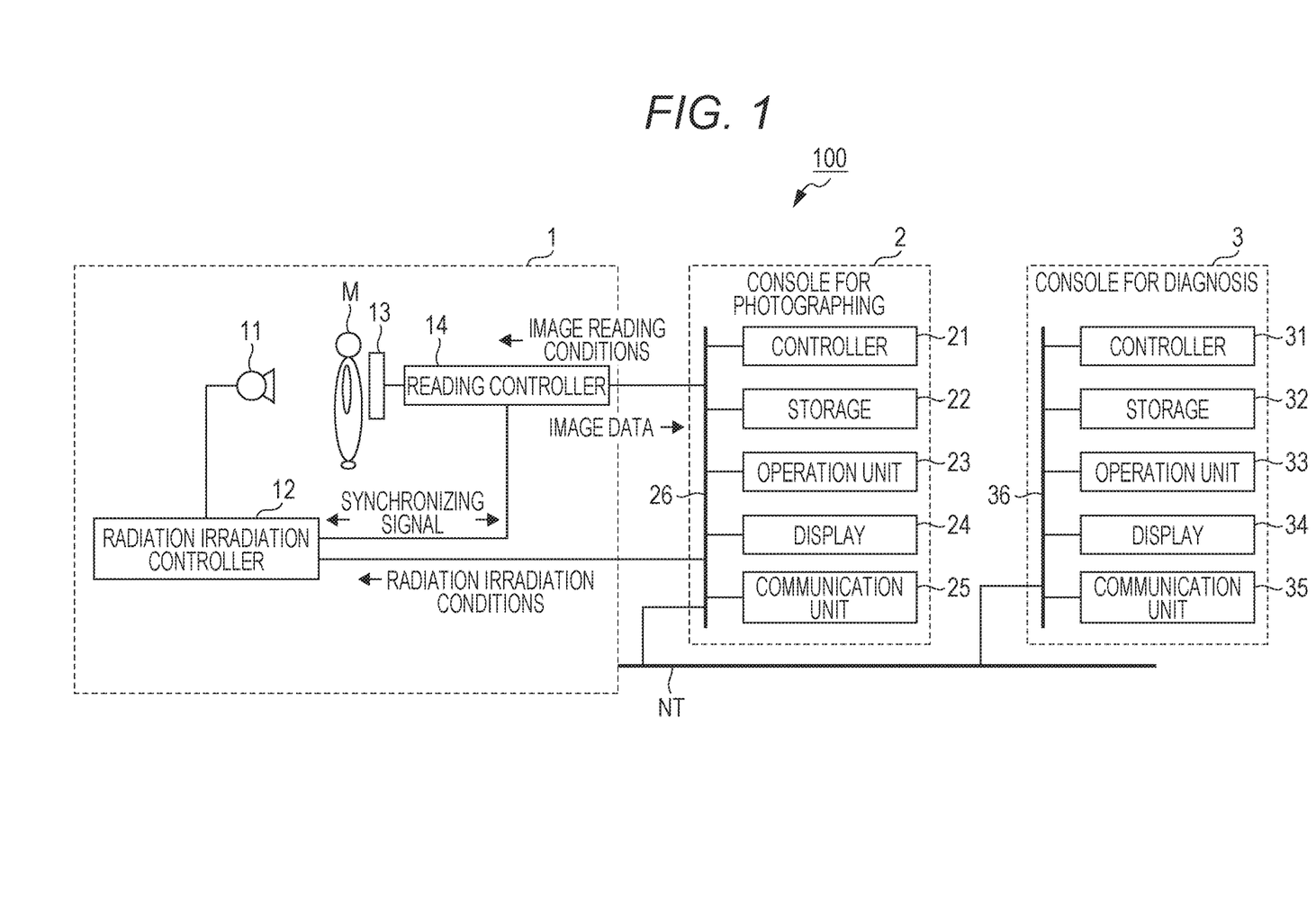
FIG. 1 illustrates a general configuration of a dynamic image processing system according to an embodiment of the present invention.

FIG. 1 illustrates a general configuration of a dynamic image processing system 100 according to an embodiment of the present invention.

As illustrated in FIG. 1, the dynamic image processing system 100 is configured in such a way that a photographing device 1 and a console for photographing 2 are connected to each other via a communication cable or the like and the console for photographing 2 and a console for diagnosis 3 are connected to each other via a communication network NT such as a local area network (LAN). Respective devices that configure the dynamic image processing system 100 conform to the digital image and communications in medicine (DICOM) standard, and communication among the respective devices is performed according to the DICOM.

[Configuration of Photographing Device 1]

The photographing device 1 is a photographing unit that photographs a dynamic state of an organism, such as a change in a form of the expansion and contraction of the lungs due to respiratory movement or heartbeats. Kymography is a technique for obtaining a plurality of images indicating a dynamic state of a subject by repeatedly irradiating the subject with radiation such as X-rays in the form of pulses at prescribed time intervals (pulse irradiation) or by continuously irradiating the subject with radiation at a low dose rate (continuous irradiation). A series of images obtained in kymography are referred to as a dynamic image. Each of a plurality of images that configure the dynamic image is referred to as a frame image. The embodiment described below will be described using, as an example, a case in which kymography is performed on the chest by using pulse irradiation.

A radiation source 11 is disposed in a position that faces a radiation detector 13 across a subject M (an examinee), and irradiates the subject M with radiation (X-rays) under the control of a radiation irradiation controller 12.

The radiation irradiation controller 12 is connected to the console for photographing 2, and controls the radiation source 11 according to radiation irradiation conditions that are input from the console for photographing 2 so as to perform radiography. Examples of the radiation irradiation conditions that are input from the console for photographing 2 include a pulse rate, a pulse width, a pulse interval, the number of photographed frames per photographing, a value of an X-ray tube current, a value of an X-ray tube voltage, the type of an additional filter, and the like. The pulse rate is the number of times of radiation irradiation per second, and matches the frame rate described later. The pulse width is a radiation irradiation time period per radiation irradiation. The pulse interval is a time period from the start of a certain radiation irradiation to the start of the next radiation irradiation, and matches the frame interval described later.

The radiation detector 13 is configured by a semiconductor image sensor such as a flat panel detector (FPD). The FPD includes, for example, a glass substrate. In a prescribed position on the substrate, a plurality of detection elements (pixels) are arranged in a matrix form, and each of the plurality of detection elements (pixels) detects radiation that has been emitted from the radiation source 11 and has passed through at least the subject M according to the intensity of the radiation, converts the detected radiation into an electrical signal, and stores the electrical signal. Each of the pixels is configured to include a switching unit such as a thin film transistor (TFT). The FPD includes an indirect conversion type FPD that converts X-rays into an electrical signal by using an optical-to-electrical conversion element via a scintillator and a direct conversion type FPD that directly converts X-rays into an electrical signal, and any of them may be used.

The radiation detector 13 is provided to face the radiation source 11 across the subject M.

A reading controller 14 is connected to the console for photographing 2. The reading controller 14 controls the switching unit of each of the pixels of the radiation detector 13 in accordance with image reading conditions that are input from the console for photographing 2 so as to switch the reading of the electrical signal stored in each of the pixels, reads the electrical signal stored in the radiation detector 13, and obtains image data. The image data is the frame image. A pixel signal value of the frame image indicates a density value. The reading controller 14 outputs the obtained frame image to the console for photographing 2. Examples of the image reading conditions include a frame rate, a frame interval, a pixel size, an image size (a matrix size), and the like. The frame rate is the number of obtained frame images per second, and matches the pulse rate. The frame interval is a time period from the start of a certain operation to obtain the frame image to the start of the next operation to obtain the frame image, and matches the pulse interval.

The radiation irradiation controller 12 and the reading controller 14 are connected to each other, and mutually communicate a synchronizing signal so as to synchronize a radiation irradiation operation and an image reading operation.

[Configuration of Console for Photographing 2]

The console for photographing 2 outputs the radiation irradiation conditions and the image reading conditions to the photographing device 1, and controls radiography and an operation to read a radiographic image that are performed by the photographing device 1. The console for photographing 2 also displays a dynamic image obtained by the photographing device 1 in order to cause a photographer such as a radiographer to confirm positioning or to confirm whether the dynamic image is an image that is suitable for diagnosis.

As illustrated in FIG. 1, the console for photographing 2 is configured to include a controller 21, a storage 22, an operation unit 23, a display 24, and a communication unit 25, and these components are connected to each other via a bus 26.

The controller 21 is configured by a central processing unit (CPU), a random access memory (RAM), and the like. The CPU of the controller 21 loads and develops a system program or various processing programs that are stored in the storage 22 into the RAM in accordance with an operation performed on the operation unit 23, performs various types of processing, such as the photographing control processing described later, in accordance with the developed program, and performs centralized control on an operation of each of the components in the console for photographing 2, and the radiation irradiation operation and the reading operation of the photographing device 1.

The storage 22 is configured by a non-volatile semiconductor memory, a hard disk, and the like. The storage 22 stores various programs to be performed by the controller 21, a parameter that is necessary to perform processing according to a program, or data such as a processing result. As an example, the storage 22 stores a program for performing the photographing control processing illustrated in FIG. 2. The storage 22 also stores the radiation irradiation conditions and the image reading conditions in association with a region to be examined (in this example, the chest is assumed). The various programs are stored in the form of a readable program code, and the controller 21 sequentially performs an operation according to the program code.

The operation unit 23 is configured to include a keyboard including cursor keys, numeric input keys, various function keys, and the like, and a pointing device such as a mouse, and the operation unit 23 outputs, to the controller 21, an instruction signal that has been input by operating keys via the keyboard or operating the mouse. The operation unit 23 may include a touch panel on a display screen of the display 24. In this case, the operation unit 23 outputs, to the controller 21, an instruction signal that has been input via the touch panel.

The display 24 is configured by a monitor such as a liquid crystal display (LCD) or a cathode ray tube (CRT), and the display 24 displays an instruction input from the operation unit 23, data, or the like in accordance with an instruction of a display signal that is input from the controller 21.

The communication unit 25 includes a LAN adapter, a modem, a terminal adapter (TA), and the like, and the communication unit 25 controls data transmission or reception to/from each of the devices that are connected to the communication network NT.

[Configuration of Console for Diagnosis 3]

The console for diagnosis 3 is a dynamic image processing apparatus that obtains a dynamic image from the console for photographing 2, performs image processing on the obtained dynamic image, and displays the processed image.

As illustrated in FIG. 1, the console for diagnosis 3 is configured to include a controller 31, a storage 32, an operation unit 33, a display 34, and a communication unit 35, and these components are connected to each other via a bus 36.

The controller 31 is configured by a CPU, a RAM, and the like. The CPU of the controller 31 loads and develops a system program or various processing programs that are stored in the storage 32 into the RAM in accordance with an operation performed on the operation unit 33, performs various types of processing, such as the density change information extraction processing described later, in accordance with the developed program, and performs centralized control on an operation of each of the components in the console for diagnosis 3. The controller 31 functions as an extraction unit, a feature point setting unit, a corresponding point search unit, an estimation unit, a selection unit, and an alignment unit.

The storage 32 is configured by a non-volatile semiconductor memory, a hard disk, and the like. The storage 32 stores various programs such as a program for causing the controller 31 to perform diagnosis assist processing, a parameter that is necessary to perform processing according to a program, or data such as a processing result. The various programs are stored in the form of a readable program code, and the controller 31 sequentially performs an operation according to the program code.

The storage 32 also stores a dynamic image photographed in the past in association with an identification ID, patient information (examinee information; for example, a patient ID, the name of a patient (an examinee), height, weight, age, sex, and the like), examination information (for example, an examination ID, examination date, a region to be examined (in this example, the chest), a respiratory state, and the like), and the like.

The operation unit 33 is configured to include a keyboard including cursor keys, numeric input keys, various function keys, and the like, and a pointing device such as a mouse, and the operation unit 33 outputs, to the controller 31, an instruction signal that has been input by a user operating keys via the keyboard or operating the mouse. The operation unit 33 may include a touch panel on a display screen of the display 34. In this case, the operation unit 33 outputs, to the controller 31, an instruction signal that has been input via the touch panel.

The display 34 is configured by a monitor such as an LCD or a CRT, and conducts various displays according to an instruction of a display signal that is input from the controller 31.

The communication unit 35 includes a LAN adapter, a modem, a TA, and the like, and the communication unit 35 controls data transmission or reception to/from each of the devices that are connected to the communication network NT.

[Operation of Dynamic Image Processing System 100]

Next, an operation of the dynamic image processing system 100 described above according to the present embodiment is described.

(Operations of Photographing Device 1 and Console for Photographing 2)

First, a photographing operation performed by the photographing device 1 and the console for photographing 2 is described.

Figure 2:
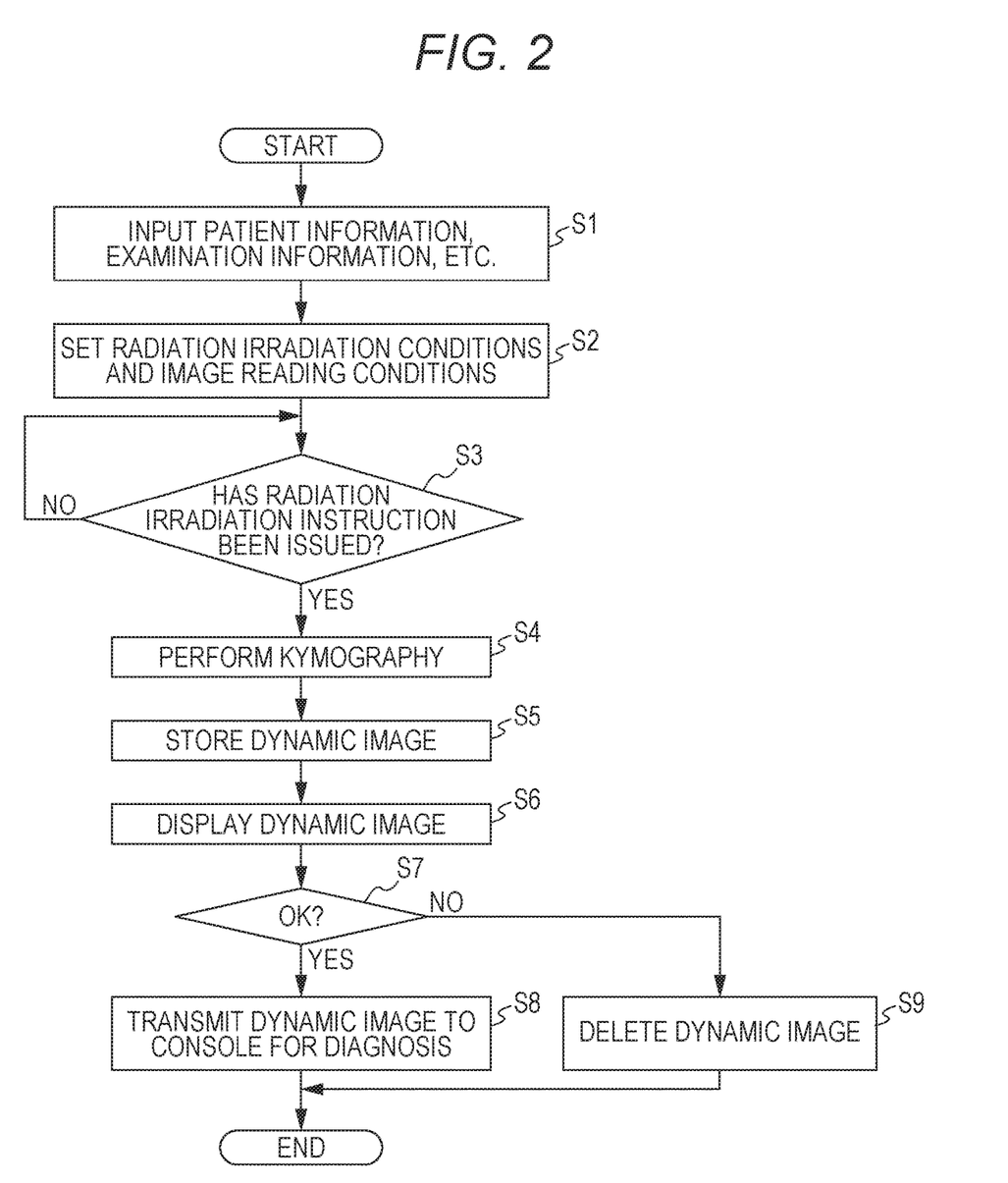
FIG. 2 is a flowchart illustrating photographing control processing performed by a controller of a console for photographing illustrated in FIG. 1.

FIG. 2 illustrates photographing control processing performed by the controller 21 of the console for photographing 2. The photographing control processing is performed in cooperation between the controller 21 and a program stored in the storage 22.

First, a photographer operates the operation unit 23 of the console for photographing 2 so as to input patient information of an examinee (a subject M) and examination information (step S1).

The radiation irradiation conditions are read from the storage 22 and are set in the radiation irradiation controller 12, and the image reading conditions are read from the storage 22 and are set in the reading controller 14 (step S2).

An instruction of radiation irradiation that will be issued by operating the operation unit 23 is awaited (step S3). At this time, the photographer disposes the subject M between the radiation source 11 and the radiation detector 13, and performs positioning. The photographer also issues an instruction about a respiratory state (for example, quiet respiration) to the examinee (the subject M). At a point in time at which photographing preparation is finished, the photographer operates the operation unit 23, and inputs a radiation irradiation instruction.

When the radiation irradiation instruction is input via the operation unit 23 (step S3; YES), a photographing start instruction is output to the radiation irradiation controller 12 and the reading controller 14, and kymography is started (step S4). Stated another way, radiation is emitted from the radiation source 11 at pulse intervals that have been set in the radiation irradiation controller 12, and a frame image is obtained by the radiation detector 13.

When a prescribed number of frames are photographed, the controller 21 outputs an instruction to finish photographing to the radiation irradiation controller 12 and the reading controller 14, and the photographing operation is terminated. The number of frames to be photographed is the number of frames in which at least a single respiratory cycle can be photographed.

The frame image obtained in photographing is sequentially input to the console for photographing 2, is stored in the storage 22 in association with a number (a frame number) indicating a photographing order (step S5), and is displayed on the display 24 (step S6). The photographer confirms positioning and the like by using a displayed dynamic image, and determines whether an image suitable for diagnosis has been obtained in photographing (photographing OK) or rephotographing will be performed (photographing NG). The photographer operates the operation unit 23, and inputs a determination result.

When a determination result indicating photographing OK is input by performing a prescribed operation on the operation unit 23 (step S7; YES), information, such as the identification ID for identifying a dynamic image, the patient information, the examination information, the radiation irradiation conditions, the image reading conditions, or the number (the frame number) indicating the photographing order, is added to each of a series of frame images that have been obtained in kymography (for example, the information is written to a header area of image data in the DICOM form), and each of the series of the frame images is transmitted to the console for diagnosis 3 via the communication unit 25 (step S8). Then, this processing is terminated. When a determination result indicating photographing NG is input by performing a prescribed operation on the operation unit 23 (step S7; NO), a series of frame images stored in the storage 22 are deleted (step S9), and this processing is terminated. In this case, rephotographing will be performed.

[Operation of Console for Diagnosis 3]

Next, an operation of the console for diagnosis 3 is described.

Figure 3:
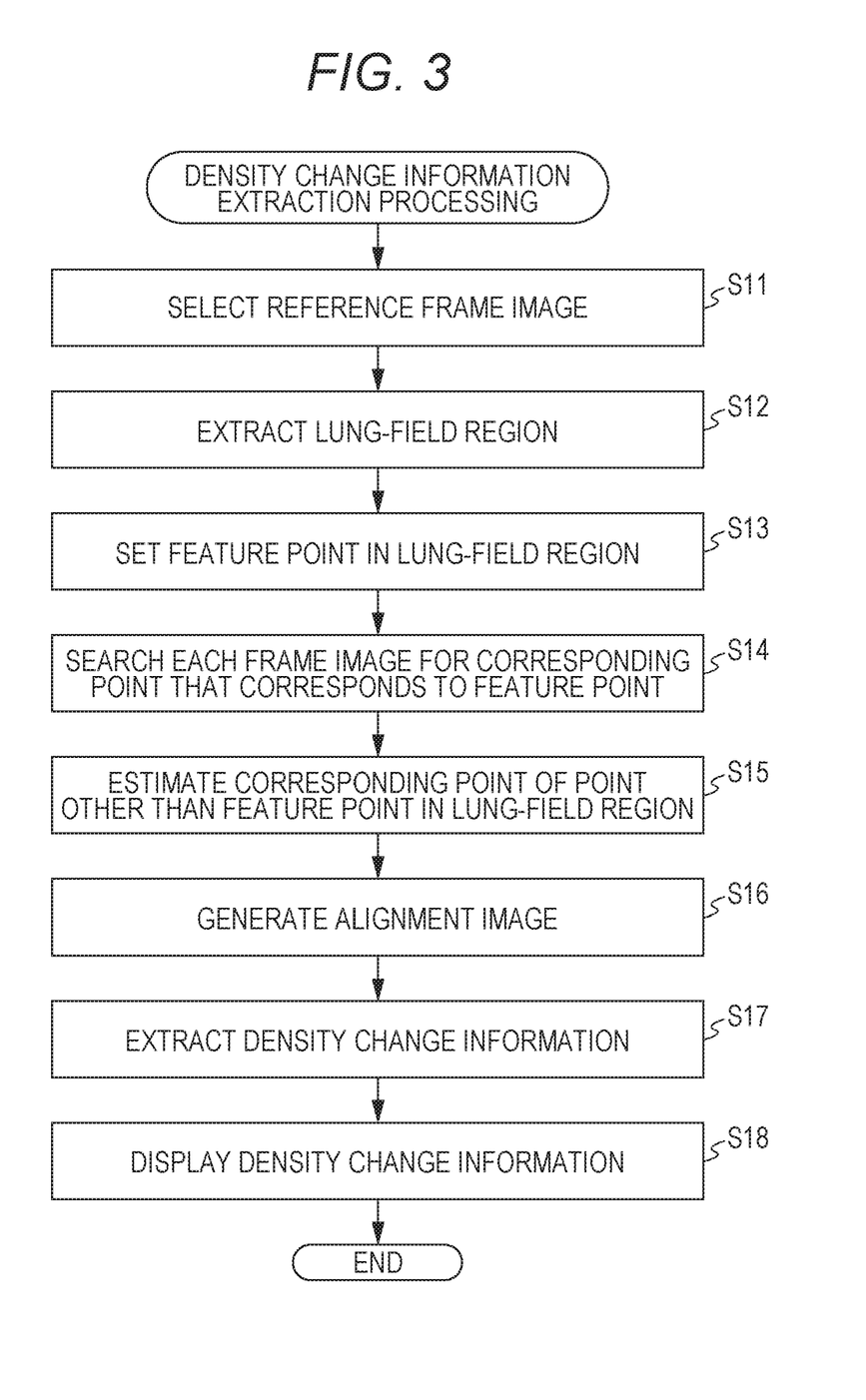
FIG. 3 is a flowchart illustrating density change information extraction processing performed by a controller of a console for diagnosis illustrated in FIG. 1.

In the console for diagnosis 3, when a series of frame images of a dynamic image are received from the console for photographing 2 via the communication unit 35, the received series of frame images of the dynamic image are stored in the storage 32 in association with the identification ID, the patient information, the examination information, and the like. In addition, when a single dynamic image is selected from dynamic images stored in the storage 32 by using the operation unit 33 and an instruction to extract density change information is issued, the density change information extraction processing illustrated in FIG. 3 is performed in cooperation between the controller 31 and a program stored in the storage 32. The density change information extraction processing is described below with reference to FIG. 3.

First, a single frame image is selected as a reference frame image from a plurality of frame images that configure a dynamic image (step S11). The reference frame image is a frame image that is used as a reference for alignment among the plurality of frame images, and any of the plurality of frame images may be used as the reference frame image. As an example, a frame image in a preset respiration phase (for example, a maximum exhalation phase or a maximum inhalation phase) may be automatically selected, or may be selected by a user operating the operation unit 33.

Then, a lung-field region is extracted from the reference frame image (step S12).

The lung-field region may be extracted by using any publicly known method. As an example, a threshold is obtained from a histogram of a signal value (a density value) of each pixel in the frame image by performing determination analysis, and a region of a signal having a value greater than the threshold is primarily extracted as a lung-field region candidate. By performing edge detection near a boundary of the primarily extracted lung-field region candidate and extracting, along the boundary, a point in which an edge becomes the maximum in each small block near the boundary, a boundary of the lung-field region can be extracted.

A feature point is set in the extracted lung-field region (step S13).

In step S13, the feature point is set in a position that moves according to the movement of the lung field due to respiration (a position that reflects the movement of the lung field) in the lung-field region extracted from the reference frame image. In this processing, a corresponding point (biologically the same point) of each point in the lung field is obtained in each of the frame images, and the density change information is extracted. When the feature point is set on a structure that moves in a direction that is different from a direction of the movement of the lung field, processing accuracy is reduced in searching for or estimating the corresponding point. Therefore, in step S13, the feature point is set in the point that moves according to the movement of the lung field due to respiration (the position that reflects the movement of the lung field), and the feature point is not set in a position that moves differently from the movement of the lung field due to respiration, such as a position in which the ribs exist.

Figure 4A:
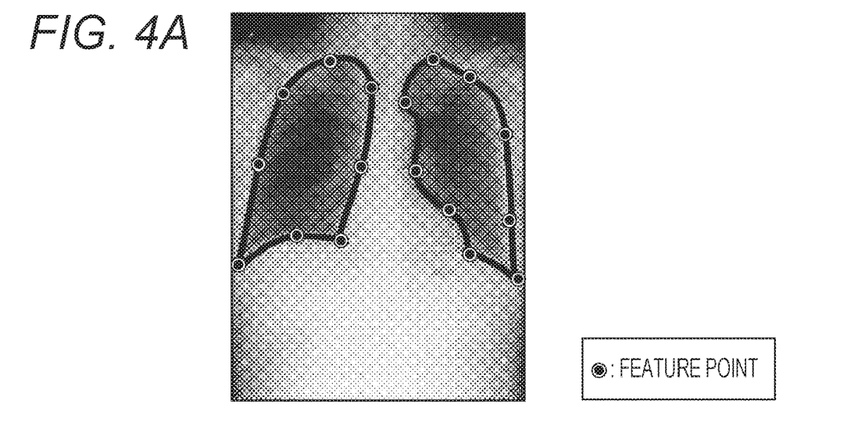
FIG. 4A illustrates an example in which a feature point is set on a lung-field contour.

As an example, the feature point is set on a lung-field contour, as illustrated in FIG. 4A. This is because the lung-field contour is assumed to most accurately reflect the movement of the lung field due to respiration. A lung-field contour near the heart strongly reflects the movement of heartbeats rather than a movement due to respiration. Therefore, it is preferable that the feature point be set in a position excluding a portion that overlaps a heart region of the lung-field contour. The heart region can be extracted by using, for example, template matching using a template image of the heart.

Figure 4B:
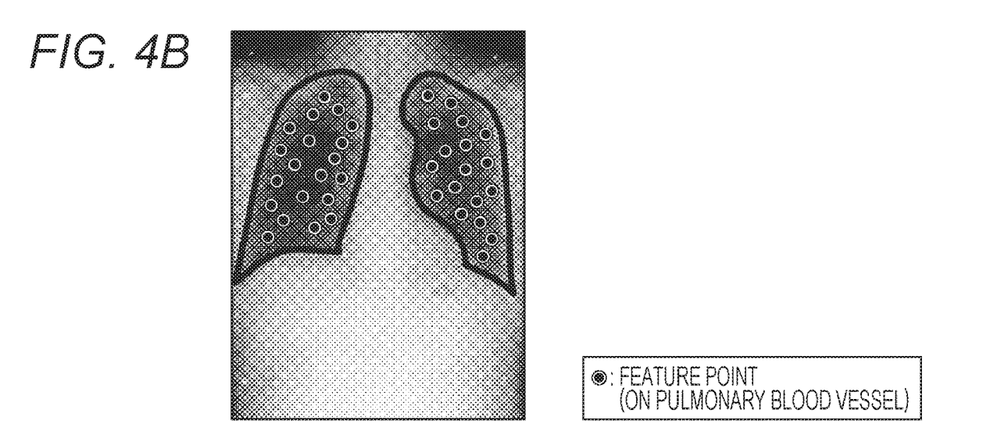
FIG. 4B illustrates an example in which a feature point is set on a pulmonary blood vessel.

As another example, the feature point may be set on a pulmonary blood vessel, as illustrated in FIG. 4B. This is because pulmonary blood vessels exist in the lung-field region and move according to the movement of the lung field due to respiration and therefore the pulmonary blood vessels are assumed to reflect the movement of the lung field. In processing for extracting the pulmonary blood vessels, a method for extracting a linear structure by using a Hessian matrix can be used, for example (see, for example, Qiang Li, "Selective enhancement filters for nodules, vessels, and airway sails in two- and three-dimensional CT scans", MEDICAL PHYSICS, SEPTEMBER 2003). It is difficult to recognize/trace the arterioles having a diameter that is less than or equal to 0.3 mm, and the arterioles do not reflect the movement of the lung field in comparison with thick blood vessels. Accordingly, it is preferable that the feature point be set on blood vessels excluding the arterioles from the extracted pulmonary blood vessels, namely, on the aortas, the arteries, the venae cavae, and/or the venae.

Figure 4C:
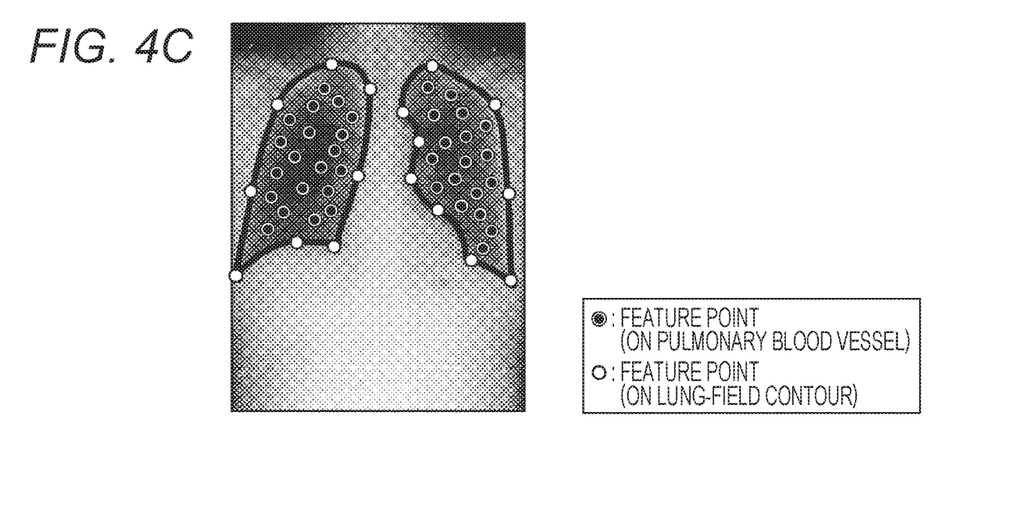
FIG. 4C illustrates an example in which a feature point is set on the lung-field contour and the pulmonary blood vessel.

As yet another example, the feature point may be set on the lung-field contour (a lung-field contour excluding a portion that overlaps the heart region is preferable) and the pulmonary blood vessel (the aortas, the arteries, the venae cavae, and/or the venae are preferable), as illustrated in FIG. 4C.

Information (such as only the lung-field contour, only the pulmonary blood vessel, or the lung-field contour+the pulmonary blood vessel) relating to the setting of the feature point in a previous dynamic image may be stored in the storage 32 in association with the patient information, and the feature point may be set in the same portion as a portion in which the feature point has been set in the past on the basis of information relating to the setting in the past of the feature point of an examinee.

Feature-point position information (coordinates) set in a previous dynamic image may be stored in the storage 32 in association with the patient information, and the feature point may be set in the same position (coordinates) as a position in which the feature point is set in the previous dynamic image of an examinee.

A user may be allowed to specify a structure on which the feature point will be set by using the operation unit 33. The user may be allowed to specify, for example, only the lung-field contour, only the pulmonary blood vessel, the lung-field contour+the pulmonary blood vessel, or the like. The user may be allowed to perform weighting (weighting to be used in the process of step S15) on a structure on which the feature point will be set.

In order to improve a degree of freedom and accuracy in setting the feature point, it is preferable that the controller 31 display, on the display 34, a correction screen 341 on which the user corrects the position of an automatically set feature point, and correct the position of the feature point according to the user's operation via the operation unit 33 (a correction unit).

Figure 5:
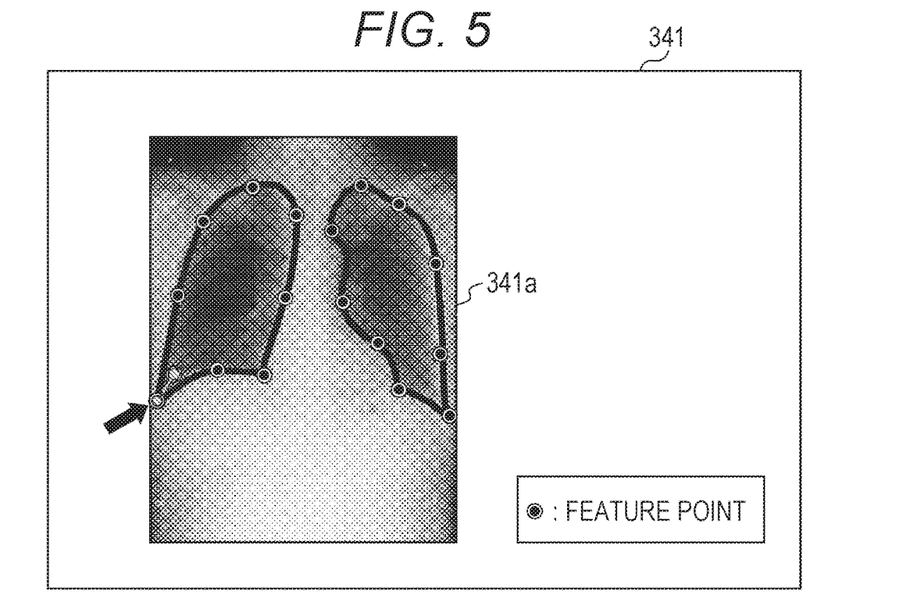
FIG. 5 illustrates an example of a correction screen.

FIG. 5 illustrates an example of the correction screen 341. As illustrated in FIG. 5, on the correction screen 341, a reference frame image 341*a* is displayed in which a mark is added in the position of the feature point. The position of the feature point can be corrected, for example, by a user specifying a feature point for which a position is desired to be corrected by using the mouse or the like of the operation unit 33 and dragging (moving) the feature point to a position after correction.

It is preferable that the correction screen 341 have a function of magnifying and displaying the lung-field region. By doing this, the accuracy of correction and the workability of correction can be improved.

A plurality of feature points may be enabled to be grouped and moved (corrected). By doing this, the efficiency of a correction task can be improved.

Before this processing, the processes of step S14 to step S16 described below may be performed on a small number of feature points or a reduced image so as to generate a preview image of an alignment image and display the preview image on the display 34. By doing this, time required to re-perform processing can be reduced.

Next, each of the frame images excluding the reference frame image is searched for a corresponding point that corresponds to the feature point (step S14).

As a method for searching for the corresponding point on each of the frame images excluding the reference frame image, the corresponding point may be directly searched for between the reference frame image and each of the frame images, or the corresponding point may be sequentially searched for between each adjacent frame images starting from the reference frame image.

A case is described in which the corresponding point is sequentially searched for between each adjacent frame images starting from the reference frame image. Assume, for example, that the total number of frame images is N and the reference frame image is an i-th frame image. First, an (i+1)th frame is searched for a corresponding point that corresponds to a feature point in the i-th frame. Then, a corresponding point in an (i+2)th frame is searched for by using the corresponding point that has been searched for in the (i+1)th frame as a reference, and corresponding points are similarly searched for in the next frame to an N-th frame. Similarly, a corresponding point that corresponds to the feature point in the i-th frame is searched for in an (i−1)th frame. Then, a corresponding point in an (i−2)th frame is searched for by using the corresponding point that has been searched for in the (i−1)th frame as a reference, and corresponding points in the next frame to a 1st frame are similarly searched for. In this processing, a motion vector from the feature point in the reference frame image to a corresponding point in each of the frame images can be calculated by adding all of the motion vectors from the reference frame image to each of the frame images. As an example, when the reference frame image is the i-th frame and a motion vector from the feature point in the reference frame image to a corresponding point in an (i+3)th frame is desired to be calculated, a motion vector from the feature point in the i-th frame to a corresponding point in the (i+1)th frame, a motion vector from the corresponding point in the (i+1)th frame to a corresponding point in the (i+2)th frame, and a motion vector from the corresponding point in the (i+2)th frame to a corresponding point in the (i+3)th frame may be added.

As a method for searching for a corresponding point in each of the frame images, as an example, template matching can be used in which a ROI having a prescribed size with each of the feature points in the reference frame image (in the case of search between adjacent frame images, each of corresponding points of feature points that have been searched for in a frame image as a reference) as a center is used as a template image. A degree of similarity in template matching can be calculated using, for example, sum of squared difference (SSD), sum of absolute difference (SAD), a cross-correlation coefficient, or the like.

A corresponding point that corresponds to each of the feature points in the reference frame image may be searched for in each of the frame images by using, for example, optical flow. Examples of optical flow include the Lucas-Kanade method of a sparse type, the Horn-Schunck method and the Gunnar-Farneback method of a dense type, and the like. Any of the methods may be used.

The position of a corresponding point that corresponds to each of the feature points in the reference frame image may be searched for in each of the frame images by using a previous corresponding point search model. As an example, a corresponding point search result in a previous dynamic image may be stored as a corresponding point search model in the storage 32 in association with the patient information and/or the examination information, and the position of a corresponding point that corresponds to a feature point may be obtained using a previous corresponding point search model of an examinee, or a previous corresponding point search model of another examinee whose information relating to a prescribed item (such as age, sex, height, weight, nationality, or a respiratory state in photographing) of the examinee information and/or the examination information is similar to (matches or has a difference within a prescribed range from) information relating to the examinee. As an example, a corresponding point that is located closest to the feature-point position set in step S13 in a corresponding point search model may be employed as a corresponding point, or a corresponding point that corresponds to a feature point in the corresponding point search model may be employed as a corresponding point with no change.

Then, for each of the frame images, a positional relationship map is generated in which a motion vector indicating a positional relationship between a feature point set in the reference frame image and its corresponding point is mapped, and interpolation is performed on the generated positional relationship map such that a corresponding point of each of the pixels (points other than the feature point) in each of the frame images is estimated (step S15).

Figure 6A:
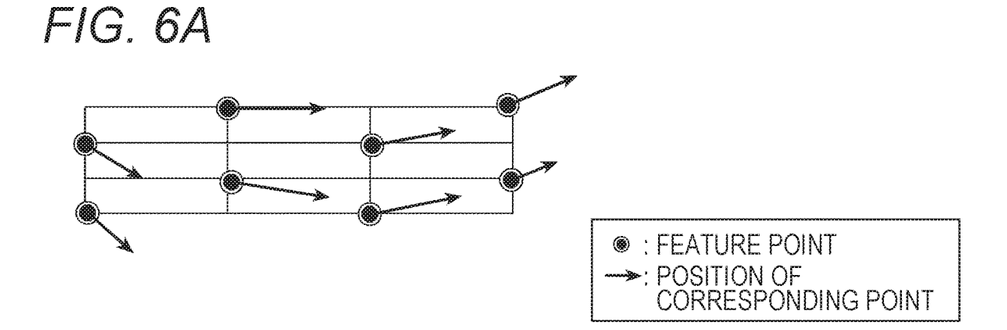
FIG. 6A schematically illustrates a positional relationship map indicating a positional relationship between a feature point and its corresponding point.
Figure 6B:
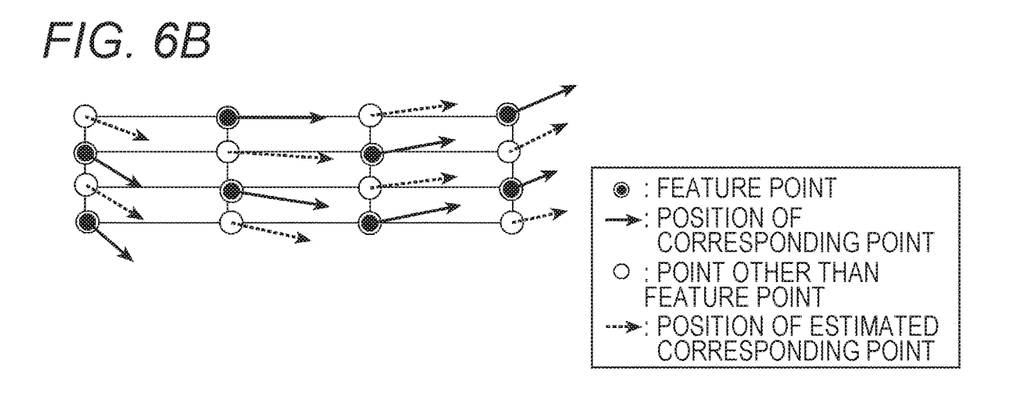
FIG. 6B schematically illustrates a positional relationship map indicating a positional relationship between all pixels after interpolation and their corresponding points.

FIG. 6A schematically illustrates a positional relationship map indicating a positional relationship between a feature point and its corresponding point. FIG. 6B schematically illustrates a positional relationship map indicating a positional relationship between each of the pixels after interpolation and its corresponding point. Examples of interpolation include spline interpolation and polynomial approximation.

In a case in which weighting is performed on a feature point, a corresponding point of each of the pixels is estimated on the basis of a positional relationship between a heavily weighted feature point and its corresponding point in step S15. By doing this, the accuracy of the estimation of a corresponding point can be improved.

In each of the frame images, an alignment image (referred to as an alignment dynamic image) is generated (step S16). In the alignment dynamic image, lung-field regions in frame images other than the reference frame image have been aligned with a lung-field region in the reference frame image on the basis of the generated positional relationship map of all of the pixels.

In the present embodiment, only a point that moves according to the movement of the lung field due to respiration is set as the feature point. Therefore, as the alignment dynamic image generated according to the present embodiment, an image can be obtained in which a structure that moves differently from the lung field, such as the ribs, is distorted (becomes unclear) due to misalignment, but the positions of the lung-field contour and the pulmonary blood vessels are fixed among the frame images, and are clear.

Next, the density change information is extracted on the basis of each of the aligned frame images (step S17).

As an example, each of the frame images is divided into a plurality of small regions (for example, small regions of 0.4 to 4 square cm), a representative value (such as a mean value, a median, a maximum value, or a minimum value) of density values of a plurality of pixels included in each of the small regions is calculated for each of the small regions, and a density waveform indicating a temporal change in the calculated density value is extracted as the density change information.

In the present embodiment, the alignment dynamic image is generated on the basis of a corresponding point between frame images, and the density waveform is extracted from the generated alignment dynamic image. However, the density waveform can be extracted by tracing a change in density of a corresponding point in each of the frame images without generating the alignment image.

Next, the extracted density waveform is displayed on the display 34 (step S18), and the density change information extraction processing is terminated.

Figure 7A:
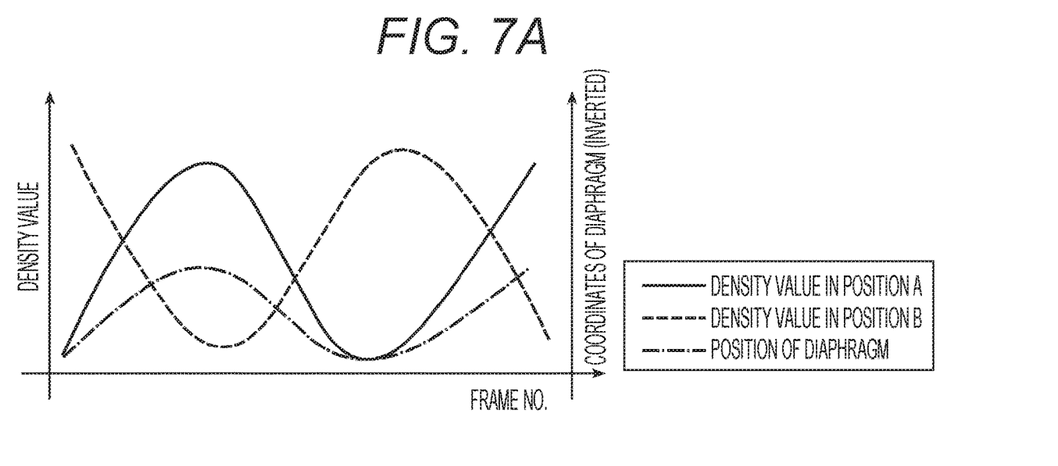
FIG. 7A illustrates examples of density waveforms before alignment in a dynamic image of an examinee having a normal ventilation.
Figure 7B:
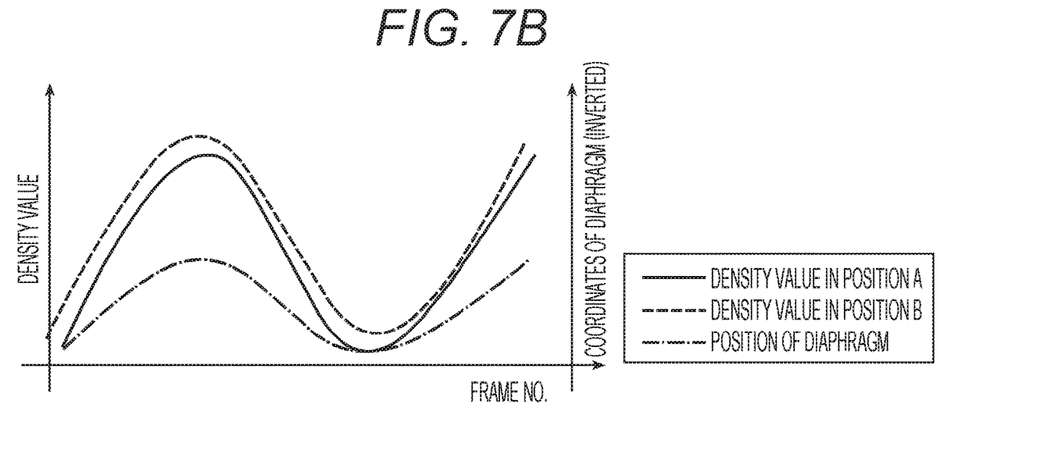
FIG. 7B illustrates density waveforms after alignment according to an embodiment of the present invention in the dynamic image of FIG. 7A.
Figure 7C:
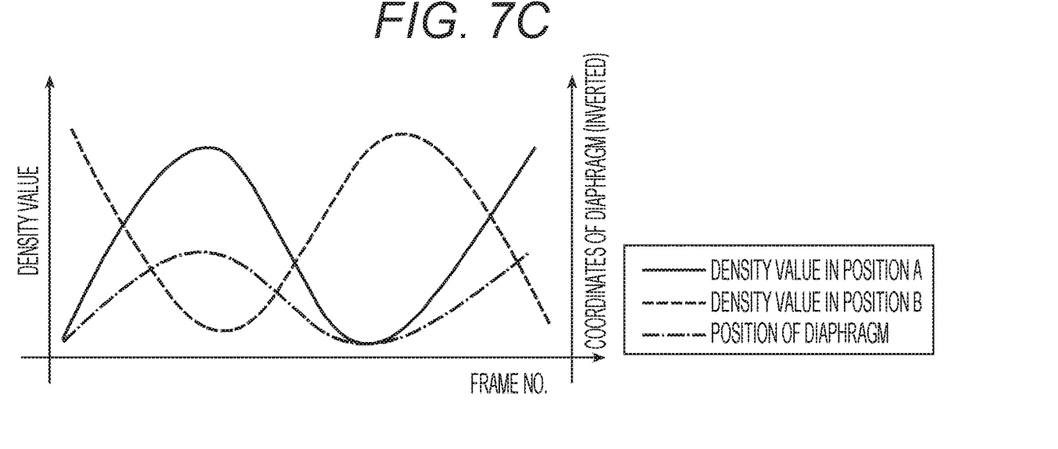
FIG. 7C illustrates density waveforms after alignment according to an embodiment of the present invention in a dynamic image of an examinee having an abnormal ventilation.

FIG. 7A schematically illustrates density waveforms that are extracted in positions A and B (position A is a position onto which the ribs are not superimposed; position B is a position onto which the ribs are superimposed) of a dynamic image before alignment of an examinee having a normal ventilation. FIG. 7B schematically illustrates density waveforms that are extracted in positions A and B of a dynamic image after alignment according to the present embodiment of the same examinee as the examinee of FIG. 7A. FIG. 7C schematically illustrates density waveforms that are extracted in positions A and B of a dynamic image after alignment according to the present embodiment of an examinee having an abnormal ventilation.

In the case of the examinee having a normal ventilation, the phase of a density waveform indicating a change in density in a temporal direction of the lung field due to respiration is expected to substantially match the phase of a waveform (referred to as a diaphragm position waveform) that is obtained by inverting a waveform indicating a temporal change in the position of the diaphragm (for example, coordinates in a case in which the position of the diaphragm in a quiet inhalation phase (at a time when the position of the diaphragm is located in the lowest position) is set as the origin). However, when the feature point is also set in a structure that moves differently from the movement of the lung field due to respiration, alignment is performed, and a density waveform is extracted from the obtained image, as in a conventional technique, in a region, such as position B of FIG. 7A, that is located near a region that overlaps the structure that moves differently from the movement of the lung field due to respiration, such as the ribs, a phase shift from the diaphragm position waveform (in an extreme case, a reverse phase) is generated due to an influence of these movements. In contrast, when a density waveform is extracted from an alignment image of an examinee having a normal ventilation that has been generated using the technique according to the present embodiment, a density waveform in which a phase shift from the diaphragm position waveform is reduced can be obtained, as illustrated in FIG. 7B. In addition, in a case in which a density wavelength is extracted from the alignment image generated in the present embodiment, it can be determined that an abnormality is highly likely to have occurred in a region in which a density waveform for which a phase deviates from a phase of the diaphragm position waveform is extracted, as illustrated in FIG. 7C.

As information that assists the diagnosis of a doctor, the controller 31 may also display the information described below on the display 34.

Figure 8:
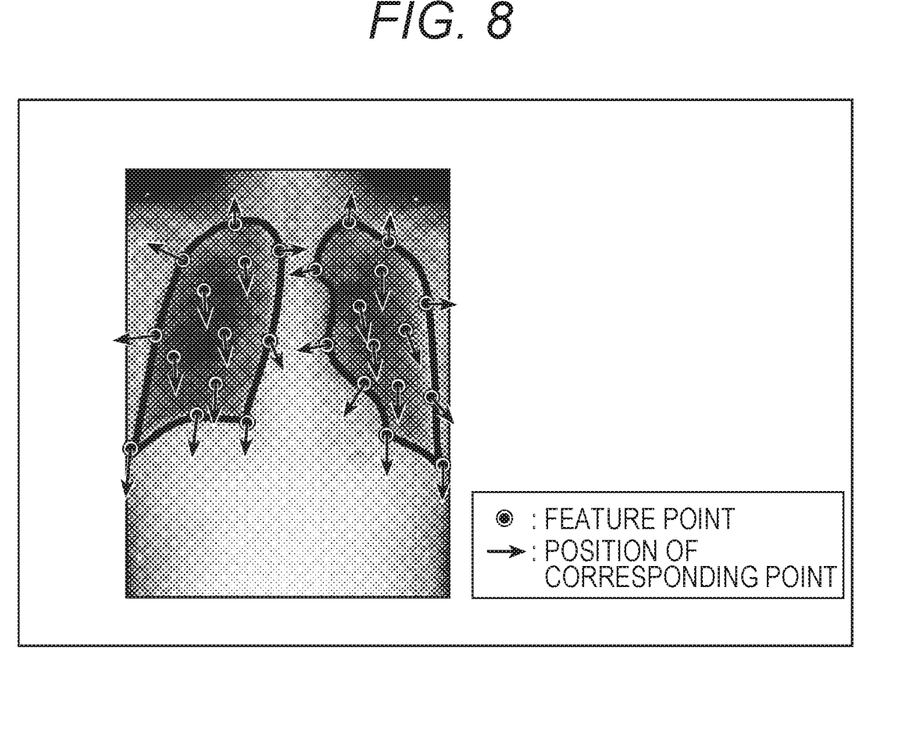
FIG. 8 illustrates an example in which a motion vector indicating a positional relationship between a feature point and a corresponding point is displayed on a reference frame image.

(1) As an example, the motion vector described above that indicates the positional relationship between the feature point and the corresponding point is added to a frame image of the dynamic image, and is displayed on the display 34. By doing this, a doctor can easily grasp whether the movement of the lung field is normal or abnormal. (1-1) As an example, as illustrated in FIG. 8, the feature point set in step S13 and a motion vector indicating a positional relationship between the feature point and its corresponding point are displayed on the reference frame image. As the motion vector, a motion vector indicating a positional relationship between the feature point and a corresponding point that is located farther from the feature point is displayed, for example. (1-2) As an example, a motion vector between the feature point in the reference frame image and its corresponding point is added to each of the frame images, and a dynamic image is displayed on the display 34.

The image displayed in (1-1) described above is referred to as a motion vector still image, and the image displayed in (1-2) is referred to as a motion vector dynamic image.

(2) Motion vector still images or motion vector dynamic images of an examinee and a normal person are displayed side by side on the display 34. By doing this, a doctor can easily grasp whether the movement of the lung field is normal or abnormal. (3) A motion vector still image or a motion vector dynamic image that only indicates a motion vector indicating an orientation specified by a user is displayed on the display 34. (4) A motion vector still image or a motion vector dynamic image that only indicates a motion vector in a region in which there is a large difference between a left-hand lung field and a right-hand lung field is displayed on the display 34. (5) Motion vector information in a position specified by a user is displayed in time series on the display 34 in the form of a graph (such as a line graph). (6) Previous motion vector still images or motion vector dynamic images have been stored in the storage 32 in association with the patient information, and motion vector still images or motion vector dynamic images of an examinee during a prescribed period are read from the storage 32, and are displayed side by side on the display 34. This enables follow-up observation. (7) Previous motion vector still images or motion vector dynamic images have been stored in the storage 32 in association with a disease name (such as COPD or interstitial pneumonia), the storage 32 is searched for images that include a motion vector that is similar to a motion vector in a motion vector still image or a motion vector dynamic image that has been currently generated, and the images that have been searched for are displayed on the display 34 together with the disease name in order of a greater degree of similarity of the motion vector. By doing this, the name of a disease that has a movement similar to the movement of the lung field of an examinee can be easily grasped. (8) The alignment image is displayed on the display 34. (9) One of the left-hand lung field and the right-hand lung field is laterally inverted in the alignment image, the motion vector still image, or the motion vector dynamic image, and the orientations of the left-hand and right-hand lung fields are aligned and displayed. (10) A waveform indicating a temporal change in a motion vector (for example, the magnitude of the motion vector) of the diaphragm is generated, and is displayed.

When the motion vector is displayed in (1) to (9) described above, the color of the motion vector may be changed according to the magnitude of the motion vector. As an example, a look up table (LUT) in which the magnitude and the color of the motion vector are associated with each other may be stored in the storage 32, and the motion vector may be displayed in a color according to the magnitude of the motion vector in accordance with the LUT.

The thickness of the motion vector may be changed according to the magnitude of the motion vector.

By doing this, a doctor can more easily grasp a portion that has a large movement amount and a portion that has a small movement amount.

The color of the motion vector may be changed according to the direction of the motion vector. As an example, a look up table (LUT) in which the direction and the color of the motion vector are associated with each other may be stored in the storage 32, and the motion vector may be displayed in a color according to the direction of the motion vector in accordance with the LUT. By doing this, a doctor can more easily grasp the direction of a movement.

As information that assists a doctor to provide an explanation to a patient, the controller 31 may display information (11) to information (17) described below on the display 34.

Figure 9:
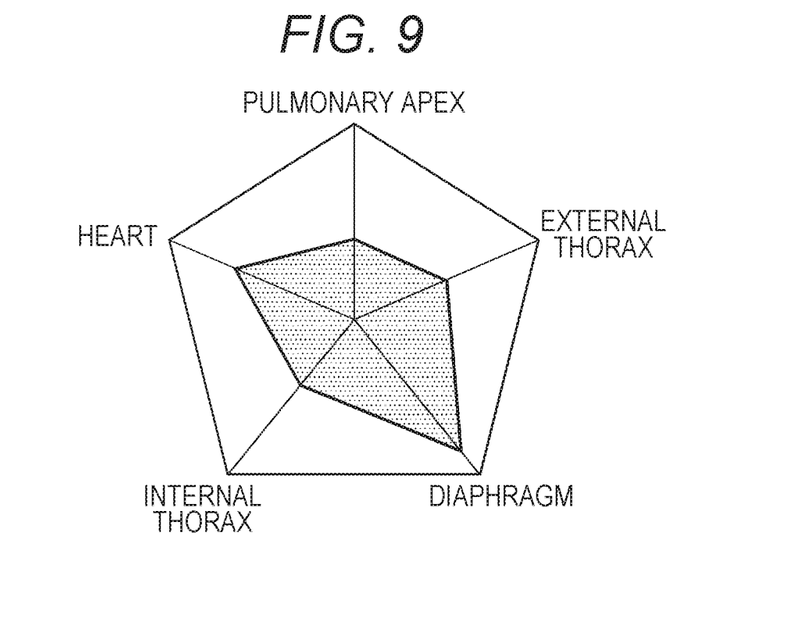
FIG. 9 illustrates an example in which an amount of movement (the magnitude of a vector) in each region, such as the pulmonary apex, the diaphragm, the external thorax, or the internal thorax, in a motion vector still image is indicated using a radar chart.

(11) Motion vector still images or motion vector dynamic images of a normal person and a disease patient are displayed simultaneously (side by side or superimposedly). (12) A previous motion vector still image or motion vector dynamic image of an examinee has been stored in the storage 32, and the previous motion vector still image or motion vector dynamic image and a motion vector still image or motion vector dynamic image that has been generated in a current examination of the examinee are displayed side by side or superimposedly in order to easily conduct follow-up observation. (13) A change portion (the magnitude and orientation of the motion vector) between a previous motion vector still image or motion vector dynamic image and a motion vector still image or motion vector dynamic image that has been generated in a current examination of an examinee is emphasized (for example, the change portion is changed in color), and these images are displayed side by side or superimposedly in order to easily conduct follow-up observation. (14) When a motion vector still image or motion vector dynamic image of an examinee is displayed, a numerical value (a numerical value of a change amount) and a descriptive text (for example, "move in ∘∘ direction by ΔΔ mm") of a motion vector are additionally displayed. This enables a movement amount of the lung field to be quantitatively displayed. (15) A disease that has a motion vector that is similar to the motion vector of an examinee is searched for, and the name of the disease and a difference amount between the motion vector of the examinee and the motion vector of the disease are displayed on the display 34. By doing this, the examinee and a disease that has a movement of the lung field similar to the movement of the lung field of the examinee can be easily compared with each other. (16) A current motion vector still image or dynamic image of an examinee and a motion vector still image or dynamic image in a case in which a disease will be ameliorated (a motion vector still image or dynamic image of prognostic prediction) are displayed simultaneously (side by side or superimposedly). (17) As illustrated in FIG. 9, an amount of movement (the magnitude of a vector) in each region, such as the pulmonary apex, the diaphragm, the external thorax, or the internal thorax, in a motion vector still image of an examinee is displayed using a radar chart.

As described above, the controller 31 of the console for diagnosis 3 extracts a lung-field region from at least one of a plurality of frame images of a chest dynamic image, sets a feature point in a position that moves according to the movement of the lung field due to respiration in the extracted lung-field region, and searches frame images other than the frame image in which the feature point has been set for a corresponding point that corresponds to the set feature point. A correspondence relationship of each pixel in the lung-field region is estimated among the plurality of frame images of the chest dynamic image on the basis of a positional relationship between the set feature point and the corresponding point that has been searched for.

Accordingly, the feature point is set in a position that moves according to the movement of the lung field due to respiration in the lung-field region. Therefore, a contradiction is not caused in the direction of movement in contrast to a case in which the feature point is set in a structure (such as the ribs) that moves in a direction that is different from the direction of the movement of the lung field due to respiration, and a corresponding point is searched for or estimated. This enables pixels indicating biologically the same position in the lung field to be accurately made to correspond to each other. As a result, the accuracy of the extraction of information relating to a change in density in the lung field due to respiration can be improved.

The descriptive contents of the embodiment above are a preferable example of the present invention, and the present invention is not limited to this.

As an example, the embodiment above has been described using, as an example, a case in which one reference frame image is selected. However, a plurality of reference frame images may be selected. As an example, in a dynamic image in which a plurality of respiratory cycles are photographed, a frame image in each quiet exhalation phase may be selected as the reference frame image. A configuration may be employed in which a user interface (such as an operation screen) is included that a user uses to specify each of the reference frame images and a range of frame images to be aligned with each of the reference frame images by operating the operation unit 33.

In the embodiment above, it has been described that a lung-field region is extracted from a reference frame image, a point that moves according to the movement of the lung field due to respiration in the extracted lung-field region is set as a feature point, and another frame image is searched for a point that corresponds to the set feature point. However, the lung-field region may be extracted from each of the frame images, the feature point may be set in the lung-field region in each of the frame images, and another frame image may be searched for a point that corresponds to the set feature point in each of the frame images.

The controller 31 may serve as a suppression unit so as to perform bone suppression processing (see, for example, WO2015/157067) for suppressing a signal component resulting from a bone on each of a plurality of frame images in a chest dynamic image, and may perform the processes of step S13 and the subsequent steps in the density change information extraction processing described above by using frame images in which the signal component resulting from the bone has been suppressed. By doing this, the accuracy of the recognition/tracing of pulmonary blood vessels is improved. In addition, a change in density due to bones in the lung-field region can be suppressed from being generated, and the accuracy of density analysis is improved.

The lung-field region may be extracted before or after the bone suppression processing. When at least the setting of a feature point and a search for a corresponding point that corresponds to the feature point are performed using frame images after the bone suppression processing, alignment can be accurately performed.

A movement in a vertical direction of the lung field (principally the movement of the diaphragm) is very large with respect to movements in other directions, and when a search for the corresponding point according to the embodiment described above is conducted in the movements in the vertical direction and the other directions, the accuracy of the search may be reduced. Accordingly, the controller 31 may extract in advance a lung-field region from each of the frame images, may align, in the vertical direction, the lung-field regions in the respective frame images with each other (a vertical-direction alignment unit), and may perform the processes of step S13 and the subsequent steps in FIG. 3 on a dynamic image on which alignment in the vertical direction has been performed.

Figure 10:
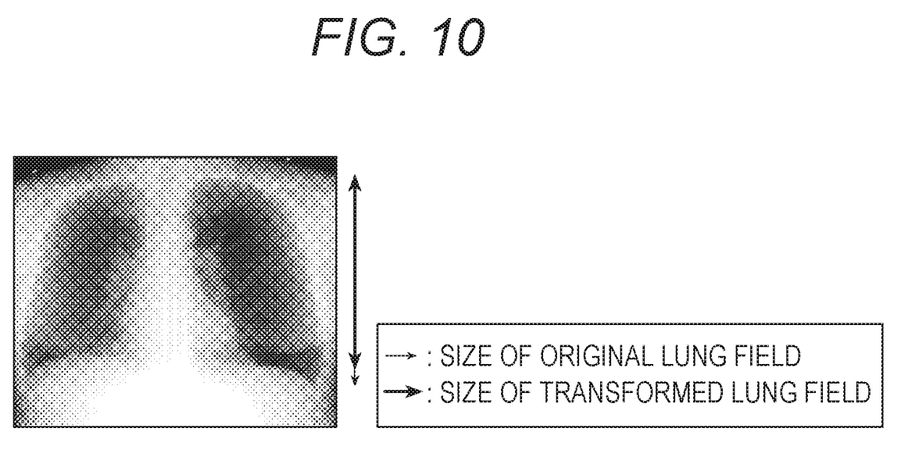
FIG. 10 illustrates an example in which only a vertical direction of a lung-field region in a certain frame image has been aligned with a reference frame image.

As an example, a single reference frame image is selected from a plurality of frame images of a dynamic image, and lung-field regions in the other frame images are aligned with a lung-field region in the reference frame image only in the vertical direction. Stated another way, the shapes of the lung fields in the other frame images are magnified/reduced in the vertical direction so as to match the shape of the lung field in the reference frame image (see FIG. 10). The processes of step S13 and the subsequent processes in FIG. 3 are performed by using each of the frame images in which the lung-field region has been aligned in the vertical direction.

As a method for aligning the lung-field regions in the other frame images with the lung-field region in the reference frame image only in the vertical direction, a method can be used, for example, for estimating a transformation matrix by using a three-point method among frame images to be aligned and aligning lung-field regions in the vertical direction by using the estimated matrix according to (a) to (c) described below. (a) Reference points (for example, three point, a midpoint of left-hand and right-hand pulmonary apexes, the apex of a right-hand diaphragm, and the apex of a left-hand diaphragm) are extracted from each of the frame images. (b) A transformation matrix is estimated in such a way that the positions of three reference points extracted from each of the frame images match the positions of three reference points extracted from the reference frame image. (c) A lung-field region in each of the frame images is aligned in the vertical direction with a lung-field region in the reference frame image by using the estimated transformation matrix.

As the reference point, four points, the left-hand and right-hand pulmonary apexes, the apex of the right-hand diaphragm, and the apex of the left-hand diaphragm, may be extracted, and the transformation matrix may be estimated by using the four extracted points as the reference point.

As described above, a lung-field region is extracted in advance from each of the frame images, the lung-field regions in the respective frame images are aligned with each other in the vertical direction, and the setting of a feature point, a search for a corresponding point, and alignment are performed on a dynamic image on which alignment in the vertical direction has been performed. This enables the extraction (alignment) of a corresponding point with accuracy in all directions.

As an example, in the description above, an example has been disclosed in which a hard disk, a non-volatile semiconductor memory, or the like is used as a computer readable medium storing a program according to an embodiment of the present invention. However, the present invention is not limited to this example. A portable recording medium such as a CD-ROM can be employed as another computer readable medium. In addition, a carrier wave can be employed as a medium that provides data of a program according to an embodiment of the present invention via a communication line Changes can be appropriately made to detailed configurations and detailed operations of respective devices that configure the dynamic image processing system without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A dynamic image processing apparatus comprising:
a hardware processor that:
extracts a lung-field region from at least one of a plurality of frame images of a chest dynamic image obtained by radiographing a dynamic state of a chest of an examinee;
sets a feature point in a position that moves according to a movement of a lung field due to respiration in the lung-field region extracted by the hardware processor;
searches a frame image other than a frame image in which the feature point has been set for a corresponding point that corresponds to the feature point set by the hardware processor; and
estimates a correspondence relationship of each pixel in the lung-field region among the plurality of frame images in accordance with a positional relationship between the feature point set by the hardware processor and the corresponding point searched for by the hardware processor.

2. The dynamic image processing apparatus according to claim 1, wherein the hardware processor sets the feature point in a position of a lung-field contour in the lung-field region extracted by the hardware processor.

3. The dynamic image processing apparatus according to claim 2, wherein
the hardware processor sets the feature point in a position that does not overlap a heart region of the lung-field contour.

4. The dynamic image processing apparatus according to claim 1, wherein
the hardware processor sets the feature point in positions of pulmonary blood vessels in the lung-field region extracted by the hardware processor.

5. The dynamic image processing apparatus according to claim 4, wherein
the hardware processor sets the feature point in aortas, arteries, venae cavae, or venae of the pulmonary blood vessels.

6. The dynamic image processing apparatus according to claim 1, wherein
the hardware processor searches for the corresponding point that corresponds to the feature point by using template matching or optical flow.

7. The dynamic image processing apparatus according to claim 1, further comprising:
a storage that stores a corresponding point search model in association with examinee information and/or examination information, the corresponding point search model indicating a corresponding point search result in a previous chest dynamic image, wherein
the hardware processor searches for the corresponding point that corresponds to the feature point in accordance with the corresponding point search model stored in the storage of the examinee or an examinee that is similar to the examinee in a prescribed item of the examinee information and/or the examination information.

8. The dynamic image processing apparatus according to claim 1, wherein
the hardware processor estimates the correspondence relationship of each of the pixels in the lung-field region among the plurality of frame images by generating, for each of the plurality of frame images, a positional relationship map in which a motion vector is mapped, the motion vector indicating a positional relationship between the feature point and the corresponding point of the feature point, and by estimating a position of a corresponding point that corresponds to each pixel other than the feature point in the frame image in which the feature point has been set by interpolating the positional relationship map that has been generated.

9. The dynamic image processing apparatus according to claim 1, wherein
the hardware processor performs bone suppression processing on the plurality of frame images of the chest dynamic image, and
the hardware processor at least sets the feature point and searches for the corresponding point by using the plurality of frame images on which the bone suppression processing has been performed.

10. The dynamic image processing apparatus according to claim 1, wherein
the hardware processor selects a single reference frame image from the plurality of frame images,
the hardware processor extracts the lung-field region from the single reference frame image, and
the hardware processor sets the feature point in the position that moves according to the movement of the lung field due to the respiration in the lung-field region of the single reference frame image.

11. The dynamic image processing apparatus according to claim 1, wherein
the hardware processor:
selects a single reference frame image from the plurality of frame images; and
extracts the lung-field region from each of the plurality of frame images, and aligns a vertical direction of the lung-field region of each of the plurality of frame images with the vertical direction of the lung-field region of the single reference frame image, and
the hardware processor at least sets the feature point and searches for the corresponding point by using the plurality of frame images in which the vertical direction of the lung-field region has been aligned.

12. The dynamic image processing apparatus according to claim 11, wherein
the hardware processor obtains positions of reference points in a diaphragm and a pulmonary apex in accordance with the lung-field region extracted from each of the plurality of frame images, estimates a transformation matrix for aligning the vertical direction of the lung-field region of each of the plurality of frame images with the vertical direction of the lung-field region of the single reference frame image in accordance with the obtained positions of the reference points, and aligns the vertical direction of the lung-field region of each of the plurality of frame images with the vertical direction of the lung-field region of the single reference frame image by using the estimated transformation matrix.

13. The dynamic image processing apparatus according to claim 10, wherein
the hardware processor generates an alignment image in accordance with the correspondence relationship of each of the pixels in the lung-field region among the plurality of frame images, the correspondence relationship being estimated by the hardware processor, the alignment image being obtained by aligning the lung-field region of each of the plurality of frame images with the lung-field region of the single reference frame image.

14. The dynamic image processing apparatus according to claim 1, wherein
the hardware processor;
selects a single reference frame image from the plurality of frame images; and
generates an alignment image in accordance with a corresponding position of each of the pixels in the lung-field region among the plurality of frame images, the corresponding position being estimated by the hardware processor, the alignment image being obtained by aligning the lung-field region of each of the plurality of frame images with the lung-field region of the single reference frame image.

15. The dynamic image processing apparatus according to claim 1, wherein
the hardware processor causes a user to correct the feature point set by the hardware processor.

16. The dynamic image processing apparatus according to claim 1, further comprising:
a display that displays the chest dynamic image, the chest dynamic image being added with the positional relationship between the feature point that has been set and the corresponding point that has been searched.

* * * * *